F. W. KROGH.
ROD COUPLING.
APPLICATION FILED JAN. 21, 1918.
1,377,418.
Patented May 10, 1921.
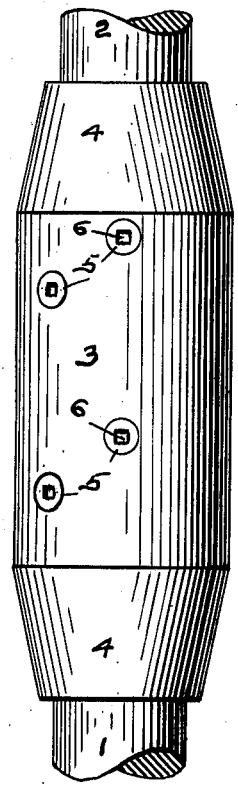
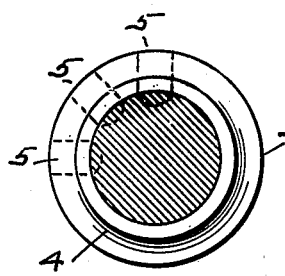
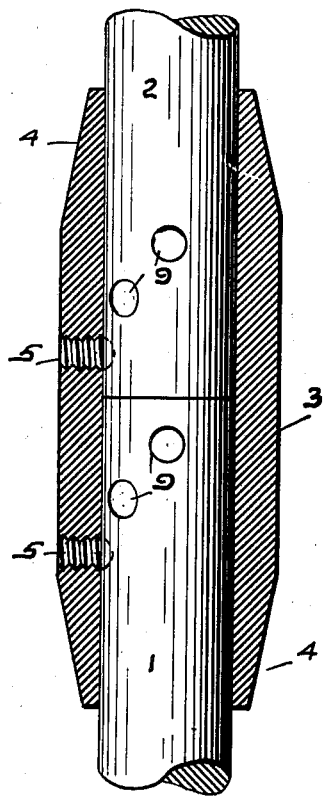
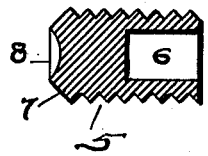

UNITED STATES PATENT OFFICE.

FERDINAND W. KROGH, OF SAN FRANCISCO, CALIFORNIA; CARL A. KROGH AND OSCAR POULSEN EXECUTORS OF SAID FERDINAND W. KROGH, DECEASED.

ROD-COUPLING.

1,377,418.           Specification of Letters Patent.      Patented May 10, 1921.

Original application filed January 2, 1915, Serial No. 124. Divided and this application filed January 21, 1918. Serial No. 212,861.

*To all whom it may concern:*

Be it known that I, FERDINAND W. KROGH, a citizen of the United States, residing in the city and county of San Francisco, California, have invented certain new and useful Improvements in Rod-Couplings, whereof the following is a specification.

This invention relates to rod couplings, especially to such couplings as are adapted for use with deep well pumps, where the coupling must be of minimum diameter and smooth exterior.

In carrying out my invention I construct a sleeve adapted to fit closely upon the rod, said sleeve having tapered ends, and I secure such sleeve upon the rod by a series of obliquely arranged set screws of peculiar construction, which when in place will be flush, or within the exterior surface of the sleeve, leaving no projections to catch upon anything.

In the accompanying one sheet of drawing I have illustrated my invention in its best form.

Figure 1 is an elevation, showing two sections of a rod connected together by my coupling.

Fig. 2 is a similar view to Fig. 1, but shows the connecting sleeve in longitudinal section.

Fig. 3 is an end view, showing the rod in section.

Fig. 4 is a longitudinal section of one of the setscrews which lock the sleeve and rod together.

In the figures:—1 and 2 represent two sections of a rod butting against one another, end to end. The sleeve 3 I construct in practice of a block of steel, bored to fit the shaft exactly, and turned to form, upon its outer surface, with the cylindrical body and tapered ends 4. The sleeve is then bored at proper points for the set screws 5, and the holes thus bored are tapped to receive the screws. The sleeve thus formed has its two ends exact replicas of each other, so that in assembling the shaft upon the ground where it is to be used, the sleeve may be applied either end either way, and fit perfectly. The set screws 5 are short stubs, screw threaded upon their exteriors, and having the square or polygonal hole 6 therein, adapted to receive a fitting wrench for turning the same. The inner end 7 of the set screw is solid and provided with a recess 8 with sharp edges which will bite into the rod and securely hold it in the sleeve. The rod is notched as at 9 being at the points where the set screws engage it, to receive the conical ends of the screws.

Having thus described my invention, and an embodiment of it, in the full, clear and exact terms required by law, and knowing that it comprises novel, useful and valuable improvements in the art to which it pertains, I here state that I do not wish to be limited to the precise construction and arrangements of the several parts, as herein set forth, as the same may be variously modified by a skilled mechanic without departing from the spirit of the invention.

What I claim and desire to secure by Letters Patent of the United States, is the following to-wit:—

In combination, a rod and a coupling, said coupling comprising a sleeve made in one piece of material adapted to closely fit the abutting ends of the rod, tapped holes in said sleeve arranged in duplicate oblique relation, corresponding holes in said rod, screws in said tapped holes of the sleeve engaging the holes in the rod, each of said screws having polygonal holes at its outer end for receiving means for driving said screws into position.

In testimony, that I claim the foregoing, I hereto set my hand in the presence of two witnesses, this 12th day of Jan. 1918.

FERDINAND W. KROGH.

Witnesses:
     FLORENCE L. WOLFE,
     LOUISE BEARDEN.